United States Patent
Williams et al.

(10) Patent No.: US 6,665,750 B1
(45) Date of Patent: Dec. 16, 2003

(54) INPUT/OUTPUT DEVICE CONFIGURED FOR MINIMIZING I/O READ OPERATIONS BY COPYING VALUES TO SYSTEM MEMORY

(75) Inventors: Robert Alan Williams, Cupertino, CA (US); Jeffrey Dwork, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 223 days.

(21) Appl. No.: 10/012,553

(22) Filed: Dec. 12, 2001

(51) Int. Cl.[7] .............................................. G06F 13/00
(52) U.S. Cl. ........................................ 710/48; 710/26
(58) Field of Search ...................... 710/46–58, 260–269

(56) References Cited

U.S. PATENT DOCUMENTS 5,566,346 A * 10/1996 Andert et al. .................. 710/8
6,078,970 A * 6/2000 Nordstrom et al. ........... 710/19
6,085,278 A * 7/2000 Gates et al. ................. 710/263
6,170,025 B1 * 1/2001 Drottar et al. ................ 710/48
6,622,185 B1 * 9/2003 Johnson et al. ............... 710/48

OTHER PUBLICATIONS

AMD-750™ Chipset Overview, Publication 190 23016 Rev: A, Issue Date: Aug. 1999, 10 pages.

* cited by examiner

Primary Examiner—Christopher B. Shin
(74) Attorney, Agent, or Firm—Manelli Denison & Selter PLLC; Leon R. Turkevich

(57) ABSTRACT

An I/O device configured for accessing a system memory via a peripheral bus minimizes I/O read accesses required by a CPU, by copying an interrupt status value from its interrupt register to a prescribed location in the system memory. Once the interrupt status value is copied into system memory, the I/O device generates an interrupt to notify the CPU of an interrupt condition requiring servicing. Hence, the interrupt status value stored in system memory enables the CPU to service the interrupt based on reading the interrupt status value from system memory, eliminating the necessity of performing an I/O read operation of the interrupt register within the I/O device via a peripheral bus.

13 Claims, 3 Drawing Sheets

INPUT/OUTPUT DEVICE CONFIGURED FOR MINIMIZING I/O READ OPERATIONS BY COPYING VALUES TO SYSTEM MEMORY

BACKGROUND OF THE INVENTION

1. Field of the Invention

The present invention relates to a transfer of data between a Central Processing Unit (CPU) and an Input/Output (I/O) device configured for communication with the CPU based on a system memory and a data bus.

2. Background Art

Existing microprocessor based computer systems typically utilize an internal clock signal that runs substantially faster than an external system bus clock. For example, such systems typically include a central processing unit, also referred to as a processor, a system memory, an input/output (I/O) device, for example a network interface, and a peripheral bus enabling the I/O device to access the system memory. The peripheral bus, for example a Peripheral Component Interconnect (PCI) bus, is substantially slower than the local buses utilized by the CPU for accessing the system memory. Hence, the CPU can execute instructions from its internal cache memory faster than accessing peripheral devices via the peripheral bus. Consequently, an I/O read operation is particularly expensive in terms of execution time (i.e., CPU execution clock cycles), since the CPU may need to wait for the I/O data to be retrieved before the CPU can execute the next instruction. In contrast, an I/O write operation typically is not as expensive as a read operation, since the CPU can start the write operation and then continue executing the next instruction without waiting for the I/O transfer to be completed.

Hence, there is a desire to reduce the number of I/O read accesses needed to manage a peripheral device in order to improve the efficiency of the system and the performance of the device.

Direct Memory Access (DMA) has been used to transfer large amounts of data to and from system memory to reduce the number of I/O instructions that the CPU must execute to manage the data transfer. For example, a network packet transmission begins by the CPU creating a transmit descriptor in system memory that includes the location and length of the block of transmit data to be transferred. The CPU then writes a single command to the I/O device (in this case the network interface device) to notify the I/O device to start the transfer. A DMA controller in the I/O device, acting as a system bus master, retrieves the transmit descriptor from system memory to determine the location of the transmit data. The DMA controller then copies the transmit data from the system memory to a transmit buffer in the I/O device via the PCI bus. Once the data transfer is completed, the I/O device generates an interrupt to notify the CPU that the data transfer is complete.

The CPU typically responds to the interrupt by performing an I/O read access on the peripheral bus to read the interrupt status register in the peripheral device. The interrupt status register typically contains an array of bits that indicates which of the several types of events caused the interrupt. After reading the interrupt status register, the CPU writes to the I/O device via the peripheral bus to clear the interrupt condition, enabling the I/O device to assert another interrupt once another interrupt condition has occurred and interrupts have been enabled by the CPU.

A bulk read operation, for example a network data packet reception, is executed based on the CPU creating one or more receive descriptors in system memory before the data packet arrives, and writing to the I/O device to indicate that the receive descriptor or list of receive descriptors is available. The DMA controller in the I/O device retrieves the receive descriptor, and waits for a packet to arrive. Upon reception of a data packet, the DMA controller in the I/O device transfers the packet data to the system memory location specified by the receive descriptor, and generates an interrupt for the CPU. The CPU services the interrupt by first performing an I/O read access via the peripheral bus to read the interrupt status register; the CPU then performs an access to clear the interrupt condition.

The necessity of a read access by the CPU via the peripheral bus for interrupt servicing substantially reduces the efficiency of the CPU, since the CPU needs to wait for the I/O data to be retrieved via the peripheral bus before the CPU can execute the next instruction. For example, peripheral buses such as existing PCI-X buses have a clock speed of 133 MHz on a 64 bit (or 32 bit) bus, whereas processor clock speeds exceed 1 GHz. Moreover, the minimum PCI transaction is four clock cycles at 133 megahertz. Hence, a single I/O read by the CPU via the peripheral bus requires the CPU to wait a substantially large number of CPU clock cycles that otherwise could be used for execution of instructions. This delay becomes even more substantial in multiprocessor systems, where one processor may attempt to access a device that is configured for communication with another processor via an associated peripheral bus. Hence, the delay encountered by a CPU during an I/O read operation can vary for example from 100 nanoseconds to 3 or 4 microseconds.

SUMMARY OF THE INVENTION

There is a need for an arrangement that enables a CPU to minimize the necessity of I/O read operations required to manage an input/output device via a peripheral bus.

There also is a need for an arrangement that enables a CPU to service an interrupt generated by a peripheral device, without requiring a CPU read operation of an interrupt status register via a peripheral bus.

These and other needs are obtained by the present invention, where an I/O device configured for accessing a system memory via a peripheral bus minimizes I/O read accesses required by a CPU, by copying an interrupt status value from its interrupt register to a prescribed location in the system memory. Once the interrupt status value is copied into system memory, the I/O device generates an interrupt to notify the CPU of an interrupt condition requiring servicing. Hence, the interrupt status value stored in system memory enables the CPU to service the interrupt based on reading the interrupt status value from system memory, eliminating the necessity of performing an I/O read operation of the interrupt register within the I/O device via a peripheral bus.

Hence, I/O read operations can be minimized, and even eliminated for interrupt servicing, substantially improving the CPU utilization during interrupt servicing.

One aspect of the present invention provides a method in a computing system having a central processing unit (CPU), a system memory, and an Input/Output (I/O) device configured for accessing the system memory via a peripheral bus. The method includes updating by the I/O device an interrupt status value of an interrupt register within the I/O device based on the I/O device detecting at least one interrupt condition, and copying the interrupt status value by the I/O device to a prescribed location in the system memory. The method also includes generating by the I/O device an interrupt for notifying the CPU of the at least one interrupt condition, and servicing the interrupt by the CPU reading the interrupt status value from the prescribed location in the system memory.

Another aspect of the present invention provides an Input/Output (I/O) device controllable by a Central Processing Unit (CPU) and configured for accessing a system memory via a peripheral bus. The I/O device includes an interrupt register configured for storing an interrupt status value, and interrupt logic. The interrupt logic is configured for updating the interrupt status value in the interrupt register and copying the interrupt status value to a prescribed location in the system memory based on detecting at least one interrupt condition. The interrupt logic also is configured for generating an interrupt upon copying the interrupt status value to the prescribed location, enabling the CPU to service the interrupt based on reading the interrupt status value from the prescribed location.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
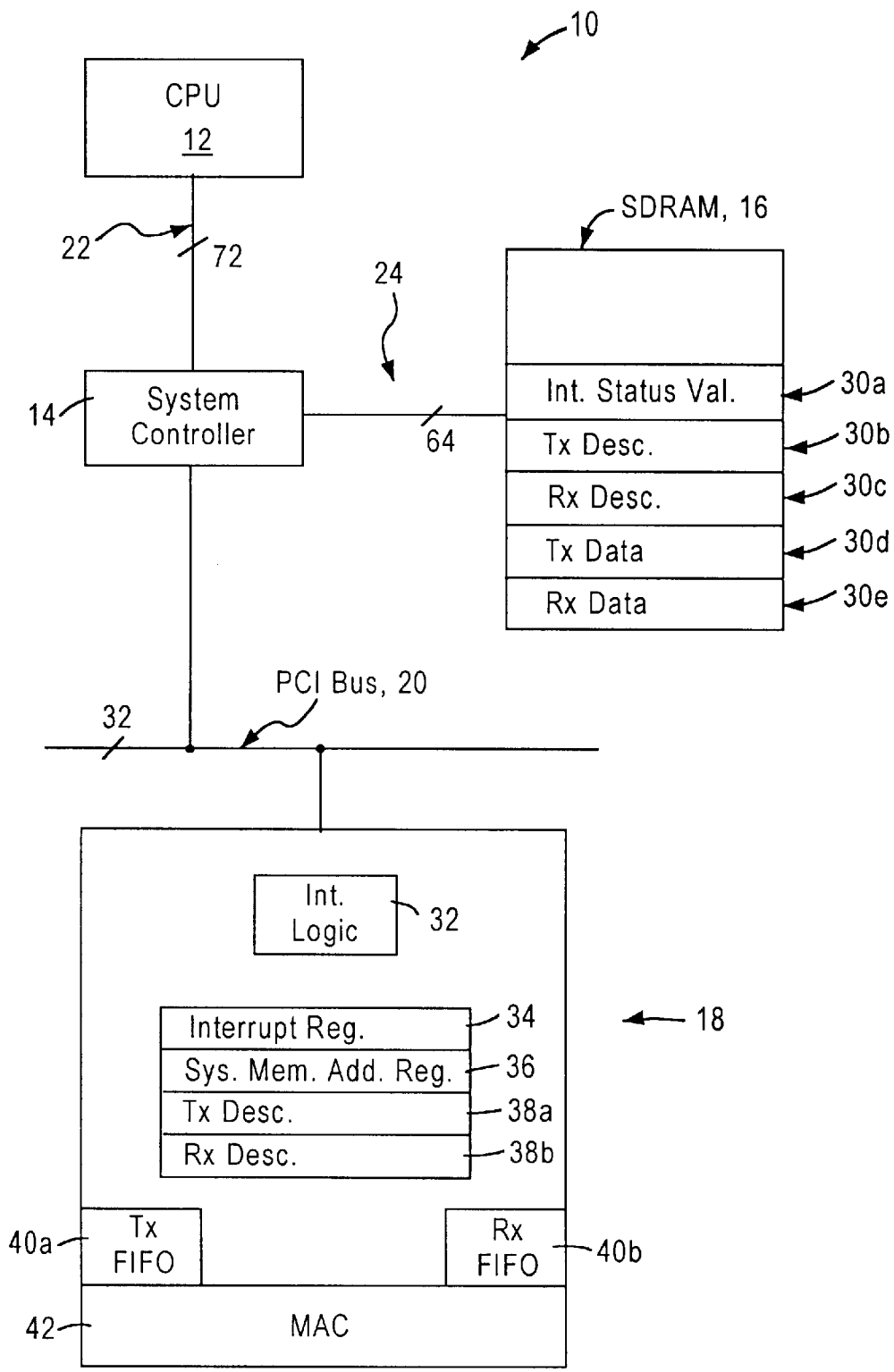
FIG. 1 is a block diagram illustrating a computing system configured for providing I/O operations based on copying interrupt status values into system memory, according to an embodiment of the present invention.

FIG. 1 is a block diagram illustrating a computing system configured for minimizing I/O read operations during interrupt servicing, according to an embodiment of the present invention. The computing system 10 includes a central processing unit (CPU) 12, a system controller 14, a system memory 16 such as an SDRAM, and an I/O device 18 configured for accessing the system memory 16 via a peripheral bus 20, for example a Peripheral Component Interconnect (PCI) bus. The CPU 12, for example a commercially-available AMD Athlon™ processor, is configured for accessing the system memory 16 at gigabit rates via a 72-bit local bus 22 and a 64-bit memory bus 24. The system controller 14, for example a commercially-available AMD-751™ system controller, controls the transfer of data between the system memory 16 and either the CPU 12 or the 32-bit PCI bus 20. The system bus 20 also can be a 64-bit PCI-X bus.

As described in further detail below, the system memory 16 is configured for storing status and descriptor information for the I/O device 18, illustrated for example as a network interface device for an IEEE 802.3 (Ethernet) based local area network. In particular, the system memory 16 includes allocated memory regions 30 for storing different data related to the I/O device 18.

The I/O device 18, implemented for example as a network interface device, includes interrupt logic 32 configured for detecting interrupt conditions, updating interrupt status values, and copying interrupt status values and other relevant data to the system memory 16 to enable the CPU unit 12 to service interrupts without reading data via the PCI bus 20. In particular, the I/O device 18 includes an interrupt register 34, a system memory address register 36, and descriptor registers 38 for storing transmit descriptors and receive descriptors. The I/O device 18 also includes a transmit first in first out (FIFO) buffer 40a, and a receive FIFO 40b for storing transmit and received data, respectively, for transfer to and from a network using a media access controller 42.

The interrupt register 34 is configured for storing an interrupt status value, updated by the interrupt logic 32, identifying detected interrupt conditions. Each bit of the interrupt status value is configured for identifying a corresponding interrupt condition, and each bit can be cleared in response to being set externally by the CPU 12, described below. The system memory address register 36 is configured for storing a system memory address that specifies the location 30a for which the interrupt logic 32 can copy the interrupt status value stored in the interrupt register 34. In particular, the interrupt logic 32, upon updating the interrupt status value in the interrupt register 34, copies the interrupt status values to the system memory location 30a specified by the system memory address register 36, enabling the CPU 12 to read the interrupt status value from the system memory location 30a in response to an interrupt. Additional information also may be stored within the system memory 16 for interrupt handling. For example, the transmit descriptors stored in registers 38a nay be stored in the system memory location 30b, and the received descriptors stored in register 38b may be stored in the system memory location 30c. Note that the access of the system memory 16 by the interrupt logic 32 is distinct from DMA transfers used to transfer transmit data from the system memory location 30d to the transmit FIFO 40a, or DMA transfers to transfer the received data from the received FIFO 40b to the system memory region 30e.

Figure 2:
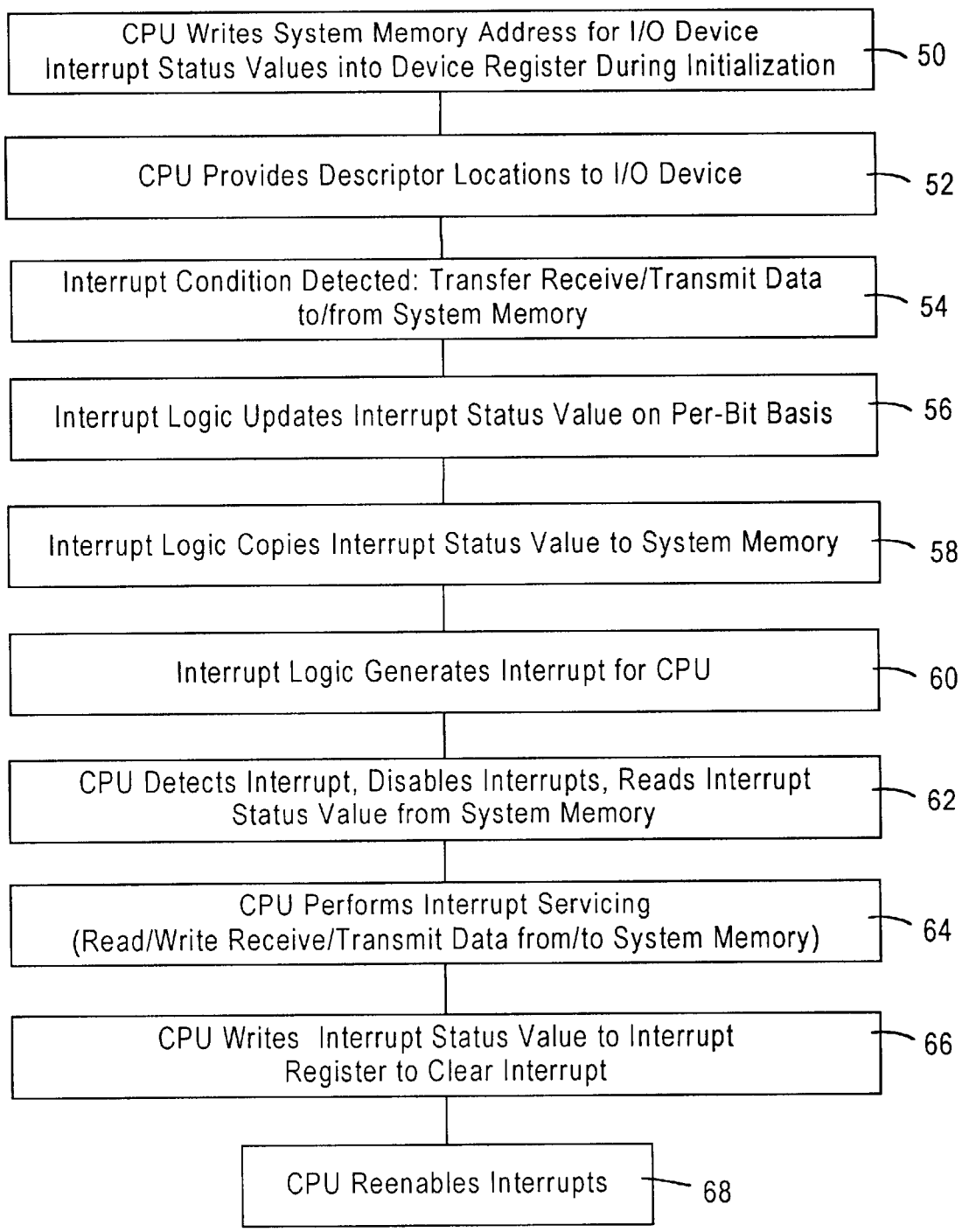
FIG. 2 is a flow diagram illustrating the method of generating and servicing an interrupt based on interrupt status value stored within system memory, according to an embodiment of the present invention.
Figure 3:
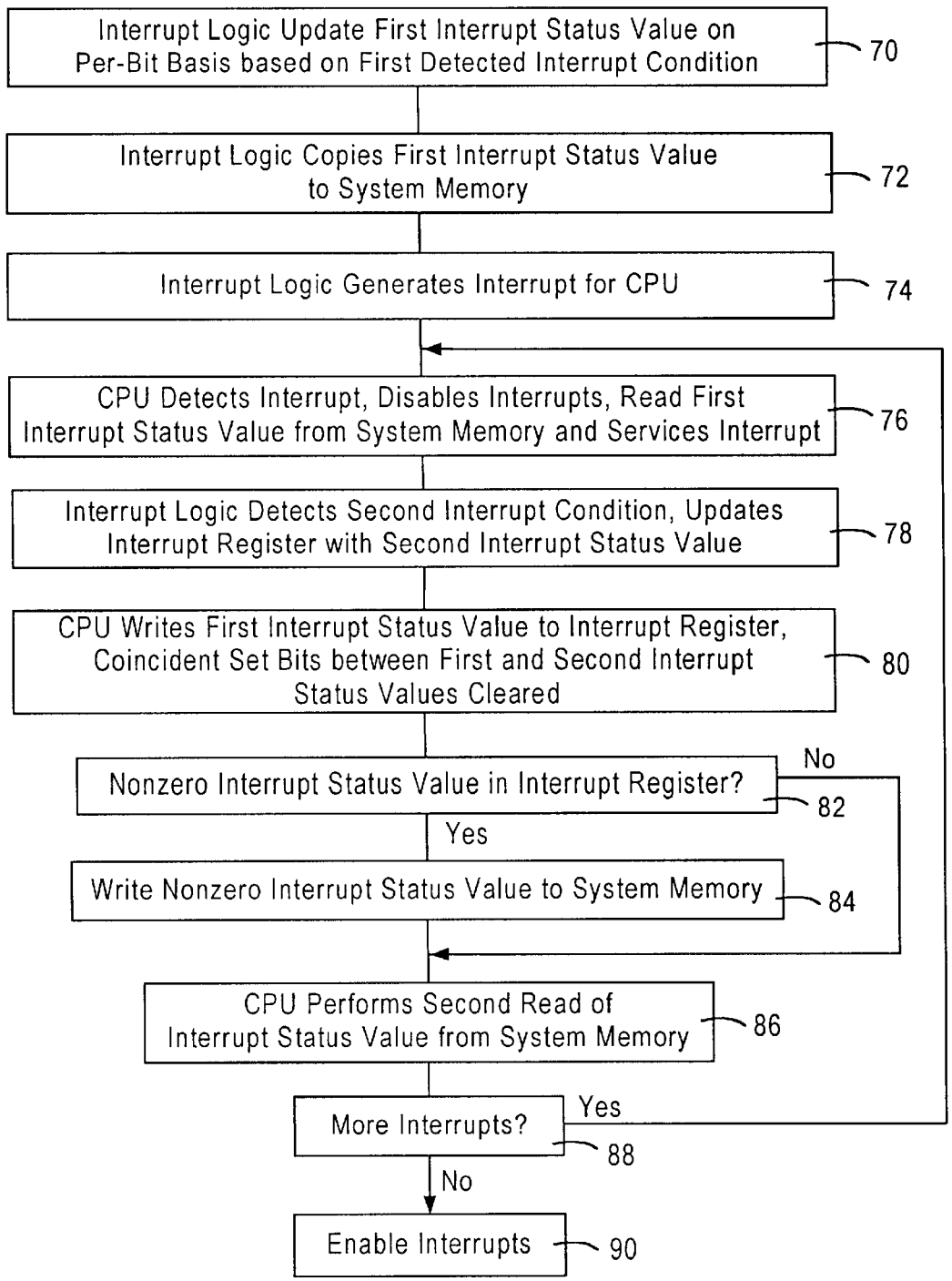
FIG. 3 is a flow diagram illustrating in further detail the processing of sequential interrupt conditions by the I/O device and the CPU of FIG. 1, according to an embodiment of the present invention.

FIGS. 2 and 3 are flow diagrams illustrating in further detail the method of minimizing 110 read operations by the CPU 12, based on copying interrupt status values into the system memory 16, according to an embodiment of the present invention. FIG. 2 illustrates a basic example of an interrupt operation, whereas FIG. 3 illustrates a more complex example related to multiple interrupt conditions. Different variations of operations also may be implemented, given the asynchronous nature of the detection of interrupt conditions.

As illustrated in FIG. 2, the method begins in step 50 by the CPU 12 writing the system memory address value for the memory region 30a into the system memory address 36 during initialization of the computing system 10. The CPU also provides in step 52 descriptor locators to the I/O device 18 enabling the I/O device to access the descriptors from the system memory 16.

Normal operation of the I/O device 18 begins in step 54, where the interrupt logic 32 detects an interrupt condition, for example detection that the frame data for a received data frame has been copied from the receive FIFO 40*b* to the system memory region 30*e*; another interrupt condition may be a detection that the I/O device 18 has copied the frame data for a transmit frame from the system memory region 30*d* to the transmit FIFO 40*a*. Other interrupt conditions may be detected as well.

In response to detecting the interrupt condition, the interrupt logic 32 updates in step 56 the interrupt status value by setting to "1" the selected bit that specifies the corresponding interrupt condition. The interrupt logic 32 then copies the interrupt status value stored in the interrupt register 34 into the assigned system memory location 30*a* in step 58, and generates in step 60 an interrupt to notify the CPU 12 of an interrupt.

The CPU 12 in step 62 detects the interrupt, disables interrupts by the peripheral device 18, and reads the interrupt status value from the assigned location 30*a* in the system memory 16. The CPU 12 performs in step 64 the necessary servicing of the interrupt based on reading the interrupt status value from the location 30*a* in the system memory 16, for example returning the transmit/receive buffer to its queue of free buffers for reuse. The CPU 12 writes in step 66 the interrupt status value back to the interrupt register 34 of the I/O device 18 in order to clear the existing interrupt; as described above, the writing of a "1" clears that bit within the interrupt register 34. Hence, if the interrupt register 34 continues to store the same interrupt status value as the interrupt status value written back by the CPU in step 66, all the bits of the interrupt register 34 are cleared. However, as described below with respect to FIG. 3, updating of the interrupt register 34 by the interrupt logic 32 following the interrupt generation enables additional interrupt events to be detected by the CPU 12 following servicing of the initial interrupts without re-enabling interrupts in the peripheral devices. After the CPU has written back the interrupt status values in step 66, the CPU re-enables interrupts in step 68 for the peripheral device 18.

FIG. 3 is a flow diagram illustrating a variation in the interrupt service process of FIG. 2, where multiple interrupt conditions are detected by the interrupt logic 32 during interrupt handling by the CPU 12. The interrupt logic 32 updates in step 70 the interrupt register 34 with a first value on a per-bit basis, similar to step 56 of FIG. 2. The interrupt logic 32 then copies the first interrupt status value stored in the interrupt register 34 to the assigned location 30*a* in the system memory 16 in step 72. The interrupt logic 32 then generates in step 74 the interrupt for the CPU 12. The CPU 12 in step 76 detects the interrupt, disables interrupt capabilities in the peripheral devices, and reads the first interrupt status value from the system memory 16 at the prescribed location 30*a*, and services the interrupt accordingly, similar to step 62.

Assume now that the interrupt logic 32 detects in step 78 a second interrupt condition while the CPU 12 is servicing the interrupt based on the first detected interrupt condition. The interrupt logic 32 updates in step 78 the interrupt register 34 with the second interrupt status value reflecting the detection of the second interrupt condition. Depending on the timing of the CPU interrupt servicing and the availability of the PCI bus 20, the interrupt logic 32 may not be able to immediately copy the second interrupt status value to the assigned portion 30*a* of the system memory 16.

Assume in step 80 that the CPU 12 writes the first interrupt status value to the interrupt register 34, similar to step 66; in this case, the coincident set bits between the first and second interrupt status values are cleared; hence, if a first and second interrupt status values are equal to each other, then the value of the interrupt register 34 is reset to 0. If in step 82 the interrupt logic 32 determines in response to the write access that the value in the interrupt register 34 is equal to 0 (i.e., all bits are zero), then the interrupt logic 32 takes no further action, since all interrupt processing has been cleared. However, if in step 82 the interrupt logic 32 determines a non-zero interrupt status value in the interrupt register 34, the interrupt logic 32 writes in step 84 the non-zero interrupt status value to the prescribed location 30*a* in the system memory 16 as soon as the PCI bus 24 is available.

Once the CPU 12 has completed interrupt processing, the CPU 12 performs in step 86 a second read of the interrupt status value from the assigned location 30*a* in the system memory 16. If the CPU 12 determines in step 88 a non-zero value indicating more interrupt conditions that require servicing, the CPU 12 returns to step 76 to process the interrupts as specified in the prescribed location 30*a* of the system memory 16. If no further interrupt processing is required, the CPU 12 enables interrupts for the peripheral device 18 in step 90.

According to the disclosed embodiment, interrupt processing and CPU resources are optimized by copying interrupt status values to system memory, minimizing the necessity for I/O read operations by the CPU 12. As apparent from the foregoing, numerous modifications and variations may arise due to the asynchronous nature of interrupt handling.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a computing system having a central processing unit (CPU), a system memory, and an Input/Output (I/O) device configured for accessing the system memory via a peripheral bus, the method comprising:

updating by the I/O device an interrupt status value of an interrupt register within the I/O device based on the I/O device detecting at least one interrupt condition;

copying the interrupt status value by the I/O device to a prescribed location in the system memory;

generating by the I/O device an interrupt for notifying the CPU of the at least one interrupt condition; and servicing the interrupt by the CPU reading the interrupt status value from the prescribed location in the system memory.

2. The method of claim 1, further comprising writing by the CPU during initialization of the computing system, within a prescribed register in the I/O device, a system memory address specifying the prescribed location.

3. The method of claim 1, wherein the updating step includes setting at least one selected bit that identifies the at least one interrupt condition.

4. The method of claim 3, wherein each bit of the interrupt register is configured to be cleared in response to being set externally, the servicing step including writing the interrupt status value back to the interrupt register to clear the at least one selected bit in the interrupt register that identifies the at least one interrupt condition.

5. The method of claim 4, further comprising second updating the interrupt status value by second setting at least one second selected bit in the interrupt register that identifies at least one second interrupt condition detected following the generating step, the step of writing the interrupt status value back to the interrupt register including selectively clearing the at least one second selected bit based on the at least one second selected bit coinciding with the at least one selected bit.

6. The method of claim 5, further comprising repeating the copying step to copy a second interrupt status value to the prescribed location based on the at least one second selected bit remaining set following the selectively clearing step.

7. The method of claim 6, wherein the servicing step includes:
   second reading the prescribed location, following servicing the interrupt based on the interrupt status value, to determine a presence of the second interrupt status value; and
   selectively continuing interrupt servicing based on detecting the presence of the second interrupt status value.

8. An Input/Output (I/O) device controllable by a Central Processing Unit (CPU) and configured for accessing a system memory via a peripheral bus, the I/O device comprising:
   an interrupt register configured for storing an interrupt status value; and
   interrupt logic configured for:
      (1) updating the interrupt status value in the interrupt register and copying the interrupt status value to a prescribed location in the system memory based on detecting at least one interrupt condition, and
      (2) generating an interrupt upon copying the interrupt status value to the prescribed location, enabling the CPU to service the interrupt based on reading the interrupt status value from the prescribed location.

9. The device of claim 8, further comprising a system memory address register configured for storing an address specifying the prescribed location and accessible by the CPU.

10. The device of claim 8, wherein the interrupt logic is configured for updating the interrupt status value by setting at least one selected bit that identifies the at least one interrupt condition.

11. The device of claim 10, wherein each bit of the interrupt register is configured to be cleared in response to being set during an operation to the interrupt register by the CPU.

12. The device of claim 11, wherein the interrupt logic is configured for second updating the interrupt status value by second setting at least one second selected bit in the interrupt register that identifies at least one second interrupt condition detected following generation of the interrupt, the at least one second selected bit being selectively cleared during the operation based on the at least one second selected bit coinciding with the at least one selected bit.

13. The device of claim 12, wherein the interrupt logic is configured for copying a second interrupt status value to the prescribed location based on the at least one second selected bit remaining set following the operation.

* * * * *